No. 790,389. PATENTED MAY 23, 1905.
E. F. PRICE.
PROCESS OF REDUCING METALLIC COMPOUNDS.
APPLICATION FILED AUG. 31, 1904.

2 SHEETS—SHEET 1.

Witnesses:
R A Balderson
J. B. Hill

Inventor:
Edgar F. Price,
by Byrnes & Townsend,
Att'ys.

No. 790,389. PATENTED MAY 23, 1905.
E. F. PRICE.
PROCESS OF REDUCING METALLIC COMPOUNDS.
APPLICATION FILED AUG. 31, 1904.

2 SHEETS—SHEET 2.

Witnesses:
R A Balderson
J. B. Hill

Inventor:
Edgar F. Price,
by Byrnes & Townsend,
Att'ys.

No. 790,389. Patented May 23, 1905.

UNITED STATES PATENT OFFICE.

EDGAR F. PRICE, OF NIAGARA FALLS, NEW YORK.

PROCESS OF REDUCING METALLIC COMPOUNDS.

SPECIFICATION forming part of Letters Patent No. 790,389, dated May 23, 1905.

Application filed August 31, 1904. Serial No. 222,889.

*To all whom it may concern:*

Be it known that I, EDGAR F. PRICE, a citizen of the United States, residing at Niagara Falls, in the county of Niagara and State of New York, have invented certain new and useful Improvements in Processes of Reducing Metallic Compounds, of which the following is a specification.

This invention relates to the reduction of refractory compounds, ores, or mixtures containing metals which are volatile at a temperature approximating that required to effect reduction and which remain liquid at a temperature below that of reduction—for example, silica and alumina.

It also relates to a method of collecting and removing the reduced metal or alloy.

It is impracticable to produce any considerable amount of silicon, aluminium, manganese, &c., by electrically heating a compound of the metal and carbon under the usual conditions, for the reason that the reduced metal readily volatilizes and is either driven out of the furnace into the air, where the metallic vapors oxidize, or combines with some of the carbon to produce a carbid. Furthermore, that portion of the metal which is not driven off is often scattered through the unreduced material in separate particles, which cannot be readily recovered.

According to this process the charge of the refractory metallic compound and reducing agent is electrically heated to the reduction temperature for a relatively short period, the maximum temperature of the charge being kept at a point which will substantially prevent volatilization of the reduced metal, and the metal is at once withdrawn from the region of maximum temperature, thereby substantially preventing its volatilization or combination with an excess of carbon. Considerable amounts of the previously-reduced metal or of an alloying metal are preferably introduced into the upper end of the furnace and caused to percolate down through the charge, thereby collecting the separate particles of metal and enabling the product to be withdrawn through a tap-hole.

The process may be carried out in electric furnaces of different types, employing either a resistance-conductor or an arc as the heating means. Three different furnaces which may be used are shown in the accompanying drawings, in which—

Figure 1:
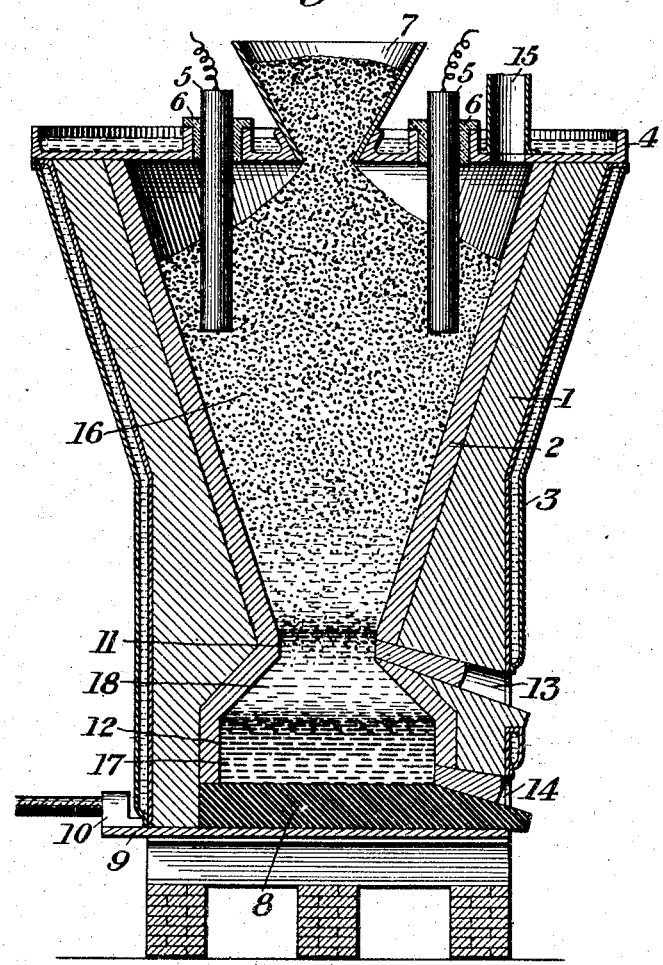
Figure 2:
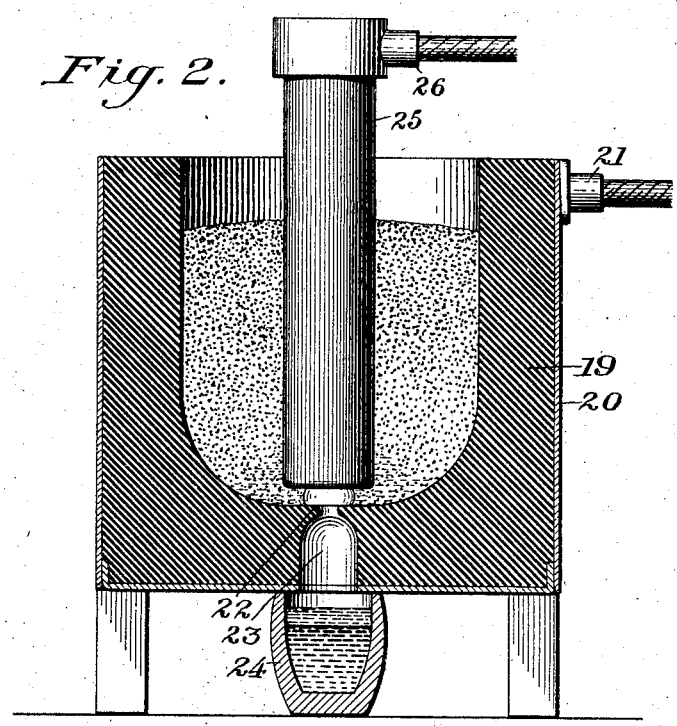
Figure 3:
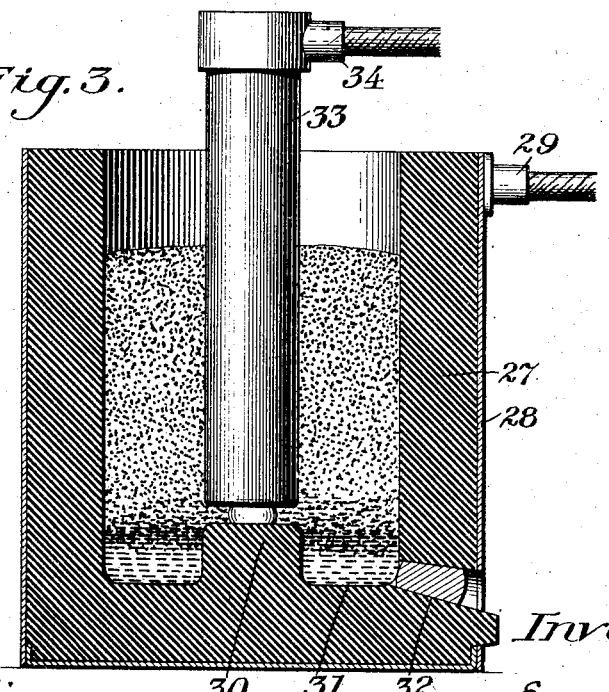

Figure 1 is a vertical axial section of a stack-furnace in which the charge and its products serve as a resistance-conductor. Fig. 2 is a vertical axial section of an arc-furnace having a central outlet, and Fig. 3 is a vertical axial section of an arc-furnace having an annular metal-receptacle and a lateral tap-hole.

The incandescence furnace (shown in Fig. 1) comprises a vertical stack 1, of fire-brick or masonry, having a refractory non-conducting lining 2, as of magnesite or siloxicon, and a water-jacket 3. The top of the furnace is closed by a metal pan 4, containing water. The electrode or electrodes of one polarity, here shown as circular carbon rods 5, extend vertically downward through openings in the top 4, being insulated therefrom by refractory sleeves 6. A feed-hopper 7 extends centrally through the top. The bottom of the furnace is closed by a carbon hearth 8, which rests on a metal plate 9, having a terminal connection 10, and is thereby constituted the other electrode of the furnace. The sides of the furnace-chamber converge downwardly from the top to a contracted neck 11 and thence diverge to a cylindrical metal receptacle or crucible 12. A tap-hole 13 for slag leads from the contracted portion 11 of the chamber, and a tap-hole 14 for metal leads from the crucible 12. An outlet 15 for the waste gases extends from the cover 4. In using this furnace to carry out the process the charge 16 of the refractory compound and reducing agent—for example, silica and carbon—is fed into the furnace until it rises to and surrounds the lower ends of the depending electrodes 5. An electric current is then passed between these electrodes and the carbon hearth 8, either by providing initial conducting-paths or employing an initial charge containing large pieces of carbon which lie in contact with each other. As soon as the charge is sufficiently heated it begins to carry the electricity and serves as a resistance-conductor, the cross-section of which decreases from the top of the furnace to the neck 11.

The density of the electric current and the heat evolved thereby increase downwardly to the neck 11, gradually heating the charge to the requisite reduction temperature. The reduced metal thereupon melts and at once drops out of the zone of maximum temperature into the cooler receptacle 12, where it may be allowed to accumulate into a body 17 and withdrawn from time to time through the tap-hole 14. As a layer of slag 18 accumulates upon the molten metal it may be withdrawn through the upper tap-hole 13. In some cases the violent ebullition in the furnace prevents the stratification and clean separation of the metal and slag. They are then preferably both removed through the lower tap-hole and separated in a settling-pot. Molten metal or pieces of metal, either that to be reduced or an alloying metal, may be introduced into the furnace with the charge and allowed to percolate down through it, collecting any scattered particles of reduced metal and carrying them into the body 17 below.

The arc-furnace shown in Fig. 2 comprises a body 19, of solid carbon, surrounded by a metal casing 20, having an electric terminal 21, by which it is constituted one electrode. A metal-outlet 22 opens centrally through the bottom of the furnace into a larger passage 23, by which the reduced metal is delivered into a vessel 24. A carbon cylinder 25, having a terminal 26, depends within the furnace to a point just above the outlet 21, whence an arc is sprung to the carbon body. In using this furnace the charge mixture is introduced from time to time and is gradually heated as it descends toward the arc, where reduction is effected. The reduced metal at once falls through the outlet 22 and passage 23 into the vessel 24. Molten or solid metal, either to be reduced or an alloying metal, such as iron, may be fed into the furnace with or upon the charge and employed to collect any particles of metal scattered through the unreduced material.

The arc-furnace shown in Fig. 3 comprises a body 27, of solid carbon, surrounded by a metal casing 28, having an electric terminal 29, by which it is constituted one electrode. A cylindrical projection 30 rises centrally from the lower part of the carbon body, leaving an annular metal-receptacle 31, from which leads a lateral tap-hole 32. The other electrode—a carbon cylinder 33, having a terminal 34—extends down within the furnace and into proximity to the projection 30, to which an arc is sprung. The operation of this furnace is similar to that of the furnace of Fig. 2, except that the reduced metal falls from the region of maximum temperature into the receptacle 31, where it may be allowed to collect and tapped off as desired.

The process and the several furnaces shown may be employed to reduce refractory compounds or mixtures containing two or more metals—for example, manganiferous iron ores for the production of ferromanganese.

I claim—

1. The process of reducing compounds of metals whose temperature of reduction and volatilization are approximately the same, which consists in heating a charge of the compound and a reducing agent by passing an electric current through said charge or the products thereof, acting as a resistance-conductor, keeping the maximum temperature of the charge at a point which will substantially prevent volatilization of the reduced metal, and removing the reduced metal from the region of maximum temperature as it is reduced, as set forth.

2. The process of reducing compounds of metals whose temperatures of reduction and volatilization are approximately the same, which consists in heating a charge of the compound and a reducing agent by passing an electric current through said charge or the products thereof, acting as a resistance-conductor, increasing the current density through said charge to a point where reduction is effected, keeping the maximum temperature of the charge at a point which will substantially prevent volatilization of the reduced metal, and removing the reduced metal from the region of maximum temperature as it is reduced, as set forth.

3. The process of reducing compounds of metals whose temperatures of reduction and volatilization are approximately the same, which consists in heating a charge of the compound and a reducing agent by passing an electric current through said charge or the products thereof, acting as a resistance-conductor, keeping the maximum temperature of the charge at a point which will substantially prevent volatilization of the reduced metal, removing the reduced metal from the region of maximum temperature as it is reduced, and tapping the slag and reduced metal from the furnace at different levels, as set forth.

4. The process of recovering metals from their compounds, which consists in heating a charge of the compound and a reducing agent in an electric furnace, and collecting the scattered particles of reduced metal by introducing a metal into the furnace and causing it to percolate downward through the charge, as set forth.

5. The process of recovering from their ores, metals whose temperatures of reduction and volatilization are approximately the same, which consists in heating a charge of the compound and a reducing agent in an electric furnace, keeping the maximum temperature of the charge at a point which will substantially prevent volatilization of the reduced metal, removing the reduced metal from the region of maximum temperature as it is reduced, and collecting the scattered particles of reduced metal by introducing a metal into the furnace and causing it to percolate downward through the charge, as set forth.

6. The process of recovering metals from their compounds, which consists in heating a charge of the compound and a reducing agent in an electric incandescence furnace, and collecting the scattered particles of reduced metal by introducing a metal into the furnace and causing it to percolate downward through the charge, as set forth.

7. The process of recovering from their ores, metals whose temperatures of reduction and volatilization are approximately the same, which consists in heating a charge of the compound and a reducing agent in an electric incandescence furnace, keeping the maximum temperature of the charge at a point which will substantially prevent volatilization of the reduced metal, removing the reduced metal from the region of maximum temperature as it is reduced, and collecting the scattered particles of reduced metal by introducing a metal into the furnace and causing it to percolate downward through the charge, as set forth.

8. The process of recovering metals from their compounds, which consists in heating a charge of the compound and a reducing agent in an electric furnace, and collecting the scattered particles of reduced metal by introducing an alloying metal into the furnace and causing it to percolate downward through the charge, as set forth.

9. The process of recovering from their ores, metals whose temperatures of reduction and volatilization are approximately the same, which consists in heating a charge of the compound and a reducing agent in an electric furnace, keeping the maximum temperature of the charge at a point which will substantially prevent volatilization of the reduced metal, removing the reduced metal from the region of maximum temperature as it is reduced, and collecting the scattered particles of reduced metal by introducing an alloying metal into the furnace and causing it to percolate downward through the charge, as set forth.

10. The process of recovering metals from their compounds, which consists in heating a charge of the compound and a reducing agent in an electric incandescence furnace, and collecting the scattered particles of reduced metal by introducing an alloying metal into the furnace and causing it to percolate downward through the charge, as set forth.

11. The process of recovering from their ores, metals whose temperatures of reduction and volatilization are approximately the same, which consists in heating a charge of the compound and a reducing agent in an electric incandescence furnace, keeping the maximum temperature of the charge at a point which will substantially prevent volatilization of the reduced metal, removing the reduced metal from the region of maximum temperature as it is reduced, and collecting the scattered particles of reduced metal by introducing an alloying metal into the furnace and causing it to percolate downward through the charge, as set forth.

12. The process of recovering metals from their compounds, which consists in heating a charge of the compound and a reducing agent in an electric furnace, and collecting the scattered particles of reduced metal by introducing iron into the furnace and causing it to percolate downward through the charge, as set forth.

13. The process of recovering from their ores, metals whose temperatures of reduction and volatilization are approximately the same, which consists in heating a charge of the compound and a reducing agent in an electric furnace, keeping the maximum temperature of the charge at a point which will substantially prevent volatilization of the reduced metal, removing the reduced metal from the region of maximum temperature as it is reduced, and collecting the scattered particles of reduced metal by introducing iron into the furnace and causing it to percolate downward through the charge, as set forth.

14. The process of recovering metals from their compounds, which consists in heating a charge of the compound and a reducing agent in an electric incandescence furnace, and collecting the scattered particles of reduced metal by introducing iron into the furnace and causing it to percolate downward through the charge, as set forth.

15. The process of recovering from their ores, metals whose temperatures of reduction and volatilization are approximately the same, which consists in heating a charge of the compound and a reducing agent in an electric incandescence furnace, keeping the maximum temperature of the charge at a point which will substantially prevent volatilization of the reduced metal, removing the reduced metal from the region of maximum temperature as it is reduced, and collecting the scattered particles of reduced metal by introducing iron into the furnace and causing it to percolate downward through the charge, as set forth.

In testimony whereof I affix my signature in presence of two witnesses.

EDGAR F. PRICE.

Witnesses:
 HARRY L. NOYES,
 F. B. O'CONNOR.